June 10, 1969　　　　S. A. SABA　　　　3,448,512
METHOD OF SOLDERING
Filed Aug. 26, 1968
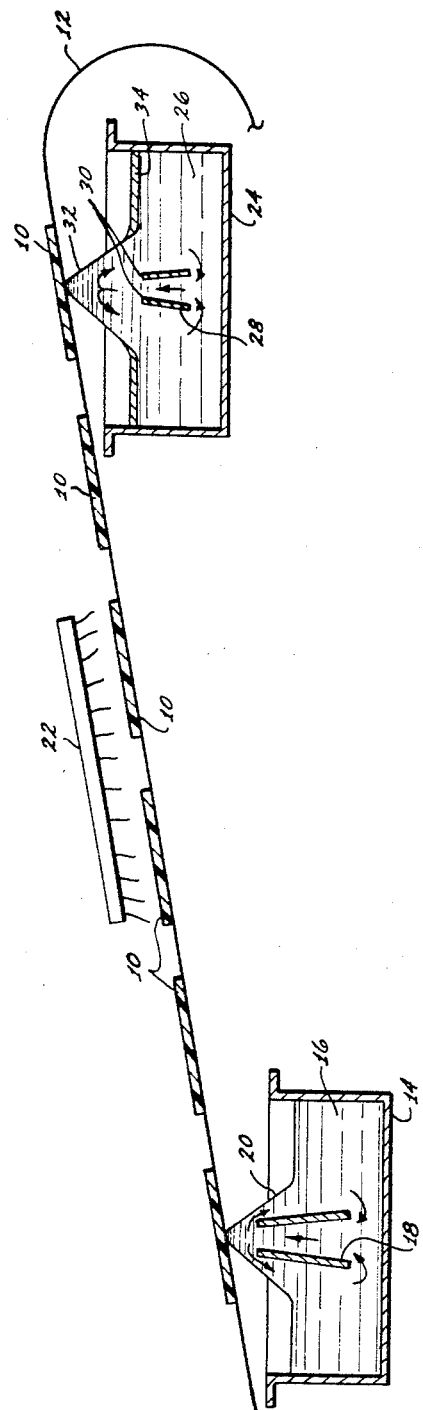
INVENTOR
SABA A. SABA
BY Nilsson + Robbins
ATTORNEYS 3,448,512
METHOD OF SOLDERING
Saba A. Saba, Fountain Valley, Calif., assignor to Electronic Engineering Company of California, a corporation of California
Filed Aug. 26, 1968, Ser. No. 755,155
Int. Cl. B23k 1/00, 35/00
U.S. Cl. 29—471.1                        1 Claim

ABSTRACT OF THE DISCLOSURE

A method of using a solder flux comprising a normally hydrophobic rosin and a hydrophilic organic emulsifying agent, having a flash point greater than the melting point of solder, in an amount sufficient to impart hydrophilic character thereto. A solvent is included to form a liquid solution with the flux. An organic acid can be added, of higher acid number than the rosin, in an amount sufficient to impart an acid number to the flux of from about 130 to about 160.

BACKGROUND OF THE INVENTION

Field of the invention

The field of art to which the invention pertains includes the field of soldering.

Description of the prior art

Rosin fluxes have been used for many years to clean surfaces to be soldered, free the surfaces from oxides and enhance the ability of the solder to wet the surfaces to form a more enduring and noncorrosive union thereof. A variety of catalytic, highly acid solder fluxes have been developed in recent years, but rosin fluxes are still required for high quality, lasting and reliable soldered joints. One other modern practice is the automatic soldering of electrical circuit parts, particularly when carried by circuit boards. In one technique, a circuit board is passed over a reservoir of rosin which is pumped up to form a wave against the board surface. The board then passes to a reservoir of solder which is similarly pumped up to form a wave to contact the board surface and solder parts exposed thereto. In such applications, the rosin adheres to portions of the board not subsequently soldered and clean-up, to remove the rosin, is often tedious and time consuming. When a solder cover fluid is utilized, such as a high-flashpoint oil, the rosin tends to dissolve in the oil and is removed when the oil is solvent-washed from the board. However, if such an oil is not utilized or if a water soluble oil is utilized, rosin removal represents a significant cost factor.

SUMMARY OF THE INVENTION

In the present invention, a solder flux is provided that retains the desirable properties of rosin fluxes, but which is particularly useful in automatic soldering operations. The solder flux herein provided aids the ability of solder to wet the metal surface of items to be soldered, cleans the metal surfaces and prevents oxide formation thereon, and yet is readily removable from metal or nonmetal surfaces. Water alone can be utilized to remove the residue solder fluxes of this invention and removal is rapid and economical leaving the soldered surfaces with a lustrous appearance.

The solder flux provided herein comprises a normally hydrophobic rosin and a hydrophilic organic emulsifying agent, having a flash point greater than the melting point of solder, in an amount sufficient to impart hydrophilic character to the rosin. A solvent can be included in an amount sufficient to form a liquid solution of the flux. In particular embodiments a catalytic activator or an organic acid is added to the flux, which acid has a higher acid number than the rosin, in an amount sufficient to impart an acid number to the flux of from about 130 to 160. In other particular embodiments the emulsifying agent is a higher fatty acid ester of a polyhydric alcohol, the ester having one or more constituents thereon of sufficient hydrophilic nature to cause the ester to be hydrophilic.

BRIEF DESCRIPTION OF THE DRAWINGS

The drawing is a diagrammatic, cross-sectional view of portions of a wave soldering machine.

DESCRIPTION OF THE PREFERRED EMBODIMENTS

Referring to the drawing, the operation of a wave soldering machine is illustrated which utilizes and obtains the advantages of a solder flux composition of this invention. A printed circuit board is carried by a conveyor rack 12 past a reservoir tank 14 of solder flux 16 of this invention. A continuous stream of solder flux 16 is pumped up into a spout 18, which extends somewhat above the surface of the solder flux 16 to form a head of flux 20 through which the work can be passed and wetted with flux. From there, the circuit boards travel to a preheating station 22 and from there to the wave soldering section of the device. The wave soldering section contains a reservoir tank 24 of molten solder 26. An elongated spout 28 is disposed within the reservoir tank 24 and extends the full width thereof, the lips 30 of the spout 28 lying just beneath the surface of the molten solder. A pump is provided (not shown) which pumps the solder 26 to the bottom of the spout 28 and up through the lips 30 to form a "wave" 32 of molten solder several inches above the surface of the reservoir of solder 26. A layer of fluid "solder blanket" 34, which will be discussed more fully below, can be provided to reduce drossing of the solder and enhance solder flow.

In this particular illustration, the solder flux 16 is obtained by mixing equal parts of (a) a 60 weight percent isopropyl alcohol solution of gum rosin, (b) a hydrophilic, oil-in-water emulsifier sold by the Emery Chemical Company under the trade name Emsorb 6910, and (c) isopropyl alcohol. Thus, a solder flux composition is provided containing about 20 weight percent of gum rosin and about 46.7 weight percent of emulsifier in about 33.3 weight percent of isopropyl alcohol.

The solder flux of this invention is hydrophilic and can be removed from components coated therewith by merely washing with water. This feature is particularly significant when one utilizes a hydrophilic fluid as the solder blanket 34. In such case, circuit boards processed through the illustrated wave soldering machine are readily cleaned utilizing only water to remove residual rosin and solder blanket fluid. The soldered parts have a lustrous appearance when so treated, not generally obtainable with prior materials. The utilization of hydrophilic solder blanket fluids is described in detail in my copending application Ser. No. 744,234, entitled "Solder Contact Fluid," filed July 11, 1968. In that application, a variety of materials are described that are suitable as hydrophilic solder blanket fluids. The same materials can be utilized in the present invention to impart hydrophilic characteristics to an otherwise hydrophobic rosin flux. Particularly suitable materials are oil-in-water emulsifiers and any of the emulsifiers described in my aforenoted application can be utilized in combination with the rosin to provide hydrophilic solder fluxes of this invention. Such materials all have flashpoints greater than the melting point of solder and generally greater than soldering temperature (typically about 495 degrees F.). Thus, anionic emulsifiers, cationic emulsifiers and nonionic emulsifiers can all be utilized.

Examples of anionic emulsifiers include the sulphonic acids and their salts such as the aliphatic sulphonates of aliphatic-aromatic hydrocarbons, and the like; aliphatic sulphates such as sulphated fatty alcohols, sulphated fatty glycerides, esters and acids, sulphated olefins, sulphonated oils, and the like; and such materials as phosphates and carboxylates. Examples of cationic emulsifiers include quaternary ammonium compounds, pyridinium compounds, amine salts and the like. Examples of nonionic emulsifiers include suitably substituted fatty esters of glycol, sorbitol and mannitol, or anhydrides thereof; substituted betaines; polymerized dioxolanes; derivitives or polyglycerols; polyethenoxy compounds; and the like. Still other materials include various polymers and macromolecules, suitably treated to be hydrophilic. The foregoing and other emulsifiers are described in detail in Surface Activity by J. L. Moilliet, B. Collie and W. Black (1961), D. Van Nostrand Co., Inc., Princeton, N.J., incorporated herein by reference.

The nonionic emulsifiers are particularly suitable from the point of view of cost-effectiveness, ready availability and appropriateness of flash point. The higher (12–24 carbon atoms) fatty acid esters of polyhydric alcohols are particularly suitable where the ester has one or more substituents thereon of sufficient hydrophilic nature to cause the ester to be hydrophilic. Thus, such fatty acid esters of glycol, glycerol, propylene glycol, mannitol and the like, can be utilized. Of particular effectiveness are the higher fatty acid esters of hexahydric alcohols and anhydrides thereof, such as the esters of sorbitol, sorbitan, mannitol and dulcitol, when additionally containing substituents of sufficient hydrophilic nature to cause the esters to be hydrophilic.

Polyoxyethylene groups are particularly suitable substituents for imparting hydrophilic properties in that they are inexpensive and, by varying the number of moles of ethylene oxide in its chain, one can tailor the hydrophilic properties to suit the molecules to which it is attached. The mechanism of ethylene oxide condensation and solubility relationships therewith are discussed in depth in Non-ionic Surfactants, edited by M. J. Shick (dated 1967, copyright 1966), Marcel Dekker, Inc., New York, incorporated herein by reference. In general, the greater the number of moles of ethylene oxide in the chain of polyoxethylene, the stronger its hydrophilic character. Thus, sorbitan monooleate substituted with polyoxethylene having twenty moles of ethylene oxide in its chain is soluble in water, insoluble in mineral oil and has a flash point of 605° F. (such a material being sold by the Emery Chemical Company under the trade name Emsorb 6900). In contrast, sorbitan monooleate from the same manufacturer (Emsorb 6901) substituted with polyoxethylene having only five moles of ethylene oxide in its chain, is only dispersible in water, is soluble in mineral oil and the flash point is only 550° F. Because the latter is dispersible in water it can impart some hydrophilic properties to the rosin and is therefore still usable in our invention, although not as a preferred material.

The length of the polyoxethylene chain is not in itself a sufficient guide for determining suitability of a material, but must be balanced with the nature of the material that is substituted therewith. For example, sorbitan monostearate substituted with polyoxethylene having twenty moles of ethylene oxide in its chain (Emsorb 6905) is soluble in water and insoluble in mineral oil, whereas sorbitan tristearate substituted with the same polyoxethylene (Emsorb 6907) is merely dispersible in water, as well as in mineral oil. The flash point of the former material is 545° F. compared to 530° F. for the latter material. In general, monoesters yield fluids with greater water solubility and higher flash points. Thus, sorbitan monolaurate, substituted with polyoxethylene having twenty moles of ethylene oxide in its chain (Emsorb 6915), is soluble in water, insoluble in mineral oil and has a flash point of 610° F.

As rosin flux, one can use any of the commercially available materials or equivalent synthetic materials, such as the methyl ester of abietic acid, the methyl ester of pimaric acid, etc. Natural rosin is obtained from the oleoresin or dead wood of pine trees by removal of the volatile turpentine, or from tall oil by removal of the fatty acid components, and contains abietic acid and other resin acids as principal components. Rosin is solid and in commercial form, for use, for example, in wave soldering machines, it is provided in solution form, generally dissolved in isopropyl alcohol. Other solvents can be utilized, their function being merely to keep the rosin in a fluid state until driven off by the heat of processing. Such solvents include: acetone, cyclohexane, methyl formate, tertbutyl alcohol, ethyl bromide, vinyl acetate, n-propylamine, ethylene chloride, methyl sulfide, n-hexane, isopentane, methyl acetate, methyl alcohol, n-propyl formate, acetyl chloride, carbon tetrachloride, ethyl acetate, ethyl alcohol, methylene chloride, methyl ethyl ketone, ethyl formate, and the like, and mixtures thereof. The solvent is advantageously water-miscible, but this is not essential especially in those processes where the solvent is driven off prior to a clean-up stage.

Commercially available rosin fluxes generally have an acid number from about 130–160, based on the rosin. In diluting the rosin with the emulsifier and additional solvent, as in the illustration, although the acid number decreases proportionately (the emulsifying agent utilized in the example has an acid number of about 2), quite satisfactory soldering operations are achieved and, surprisingly, for most purposes are equivalent to soldering results obtained with the rosin undiluted by emulsifier and additional solvent. Of course, one obtains the additional benefit of ready clean-up and lustrous appearance utilizing the modified rosin fluxes of this invention. On the other hand, in certain instances, a higher degree of activity is desired than obtainable with the modified rosin fluxes of this invention or, a specific acidity range is called for in a particular manufacturer's specification or Government specification. In such case, the acid number of the unmodified rosin can be restored by adding to the flux an organic acid of higher acid number than the rosin and in an amount sufficient to impart the desired acid number, generally from about 130 to about 160. Any of a wide variety of acids can be utilized including monocarboxylic acids, dibasic acids and hydroxy acids. Such acids include formic acid, oxalic acid, tartaric acid, succinic acid, caproic acid, pimelic acid, pelargonic acid, sebacic acid, and the like, and mixtures thereof.

With respect to the amount of the components, sufficient emulsifying agent is added to the rosin to impart hydrophilic characteristics thereto. This amount necessarily depends upon the particular materials utilized, but generally, a weight ratio of rosin to emulsifying agent of from about 5:1 to about 1:2.5 is satisfactory. Similarly, sufficient solvent is added to form a liquid solution of the rosin and emulsifying agent and this amount also depends upon the particular material utilized. In this case, however, for certain applications, one might omit the solvent altogether, e.g., when hand soldering components and applying the rosin by hand or by a mechanical device not requiring a fluid flow. Accordingly, one can use any practical amount of solvent and generally one does not have to exceed a weight ratio of solvent to rosin of about 5:1.

What is claimed is:

1. A soldering process, comprising: contacting a member to be soldered with a solder flux comprising (a) a normally hydrophobic rosin and (b) a hydrophilic organic emulsifying agent; having a flash point greater than the melting point of solder, in amount sufficient to impart hydrophilic character to said flux; and contacting said member with molten solder, said molten solder being blanketed prior to said contact with a hydrophilic, but otherwise unctuous organic material having a flash point substantially greater than the melting point of solder.

References Cited
UNITED STATES PATENTS

| | | |
|---|---|---|
| 2,573,882 | 11/1951 | Waters. |
| 3,058,441 | 10/1962 | Walker et al. |
| 3,190,527 | 6/1965 | Tardoskegy _____ 228—37 |
| 3,298,588 | 1/1967 | Shompe. |
| 3,359,132 | 12/1967 | Wittmann. |

JOHN F. CAMPBELL, *Primary Examiner.*
J. L. CLINE, *Assistant Examiner.*

U.S. Cl. X.R.
29—492, 495; 228—34, 37